United States Patent [19]

Conklin

[11] 4,138,026
[45] Feb. 6, 1979

[54] PLASTIC PACKAGE WITH HEAT SHRUNK SLEEVE

[75] Inventor: Charles S. Conklin, Cape Coral, Fla.

[73] Assignee: Owens-Illinois, Inc., Toledo, Ohio

[21] Appl. No.: 871,288

[22] Filed: Feb. 13, 1978

Related U.S. Application Data

[63] Continuation-in-part of Ser. No. 705,867, Jul. 16, 1976, abandoned.

[51] Int. Cl.$^2$ .............................................. B65D 23/08
[52] U.S. Cl. .................................................. 215/12 R
[58] Field of Search .................... 215/1 C, 12 R, 246, 215/365, DIG. 6

[56] References Cited

U.S. PATENT DOCUMENTS

| | | | |
|---|---|---|---|
| 896,903 | 8/1908 | Ferry | 215/12 R UX |
| 2,734,650 | 2/1956 | Meyer | 215/246 |
| 3,110,554 | 11/1963 | Yazumi | 156/86 |
| 3,372,826 | 3/1968 | Heaton | 215/12 R |
| 3,760,968 | 9/1973 | Amberg | 215/12 R |
| 3,927,782 | 12/1975 | Edwards | 215/1 C X |
| 3,948,404 | 4/1976 | Collins | 215/1 C |

Primary Examiner—Donald F. Norton
Attorney, Agent, or Firm—R. D. Heberling; M. E. Click; D. H. Wilson

[57] ABSTRACT

An improvement is provided in packages in which a thermoplastic bottle has a separate support base integrally and securely attached thereto for supporting the bottle in an upright position. The bottle includes a convex bottom portion incapable of supporting the bottle in a stable upright position and a peripheral sidewall above the bottom portion. The support base includes a lower package support surface and a generally tubular sidewall extending upwardly from the support surface to telescopically enclose a portion of the bottle peripheral sidewall. The specifically disclosed improvement essentially resides in providing a pre-decorated tubular label of either a closed cellular thermoplastic or a clear thermoplastic film in heat shrunk snug substantially contaminant precluding, peripheral engagement with externally exposed surfaces of the bottle peripheral sidewall and the tubular sidewall of the base and covering the juncture of the base and the bottle.

8 Claims, 9 Drawing Figures

PLASTIC PACKAGE WITH HEAT SHRUNK SLEEVE

RELATED APPLICATIONS

This application is a continuation-in-part of Ser. No. 705,867, filed July 16, 1976, now abandoned.

This application is related to application U.S. Ser. No. 700,930, filed June 29, 1976, now U.S. Pat. No. 4,082,200.

THE INVENTION

The present invention relates to composite packages for containing various products including comestibles and pressurized fluids; more particularly the invention relates to a composite package comprised of an uprightly unstable bottle having a separate support base, or cup, securely attached to the bottle.

Biaxially oriented thermoplastic bottles are receiving much attention as candidates to replace glass bottles presently being used to contain carbonated soft drinks, beer, aerosols, and the like. The thermoplastics from which these bottles are made and which are receiving the most wide acceptance are the polyesters, for example polyesters comprised of the polymeric reaction product of ethylene glycol (including its esters) and terephthalic acid (including its esters), as well as the so-called high nitrile polymers. The latter polymers are generally referred to in the trade as Lopac or Barex material. In order to increase the strength quality of such bottles and to maximize production efficiency and, from an overall point of view, to make these bottles more economically competitive with glass it has been found necessary to form such bottles with convex bottom portion. Obviously this convex bottom portion creates an unstable bottle and hence there is a need to support the bottle and, in that respect, various types of support bases are integrally and securely attached to the bottle. Exemplary of such bottles with their support bases are those set forth in U.S. Pat. Nos. 3,722,725, 3,948,404, 3,726,429, and 3,927,782. In application U.S. Ser. No. 700,930, now U.S. Pat. No. 4,082,200, which is hereby incorporated by reference, another such assembly of a support base and uprightly unstable bottle is disclosed with the package including venting features on the bottle to expedite and facilitate the integral and secure attachment of the base to the bottle.

In the packages as described above, in spite of precautions and efforts to solve the problem, a problem nonetheless exists in that the area or volume between the internal surface of the base and the external surface of the bottle is infestation prone. That is, in spite of attempts to provide for a tight, reliable seal of the base to the bottle to preclude infestation it has not been economically and commercially possible to reliably do this and, hence, dirt, liquids, such as for example, syrups and water, warehouse insects, and the like, gain entry into the above referred to zone and cause the occurrence of mould and even the formation of obnoxious odors. This, obviously, is unsatisfactory. It will of course be appreciated that unsealed areas, even as small as pinholes, can create such problems. Additionally, because of such seepage into the zone washing of the containers is not suitable practiced since it simply enhances the problem or else drain holes must be provided in the base; the latter approach while solving one problem only creates another. Additionally, these packages after assembly of the base to the bottle must be labeled before they reach the ultimate consumer and this, of course, is an extra step in the process and increases consumer costs. Such packages have, additionally, been critized as being aesthetically unappealing.

Thus, as will be seen a problem exists in the art and there is a need for providing such pacakges on a low cost, economical bases which will not be contaminant prone, i.e., subject to infestation, and which are aesthetically pleasing and which package can be provided to the ultimate consumer with a minimum number of production steps possible.

Applicant has solved this problem and satisfied the need, by employing pre-decorated heat shrunk, contaminant impermeable, synergistically functioning, means in snug peripherally disposed heat shrunk engagement with external surfaces of the thermoplastic bottle and external surfaces of the supporting base for precluding entry of contaminants between the base and the bottle. The means takes the form of employing a pre-decorated, heat shrinkable, annular, or sleeve-like label which is then brought into heat shrunk, snug, substantially contaminant precluding peripheral engagement with the bottle and base. This label substantially hides the base from view hence providing for a more aesthetically appealing package and simultaneously because of its predecoration eliminates the previously required separate step of labeling, or decorating, the package and, likewise simultaneously, precludes infestation. The benefits of this will be readily apparent to those skilled in the art.

U.S. Pat. No. 3,482,724, and its parent application U.S. Pat. No. 3,372,826, discloses a glass container having a convex bottom and a base therefor which base may be applied by heat shrinking.

U.S. Pat. No. 3,002,640, discloses a foamed polystyrene sleeve, which may have a printing thereon, about fragile articles such as, for example, glass or eggs. The sleeve is applied by slipping over the article, or by stretching it over to provide a snug fit, or by heating to expand the thickness.

U.S. Pat. No. 3,542,229 discloses the application of a shrunk-on band, which may include a decoration, of a stretchable heat shrinkable film material, for example polyvinyl chloride film onto a thermoplastic bottle; the ends of the band may be joined by gluing, sealing, or welding.

U.S. Pat. No. 3,677,774 is directed to the formation of a multipack of plural bottles, for example polyvinyl chloride bottles, which have a sleeve and which pack of plural bottles are in heat sealed envelope; the envelope contacts only part of the respective containers, i.e., the envelope does not peripherally contact the bottle and/or sleeve, and contains pressurized carbon dioxide.

U.S. Pat. No. 3,462,327 discloses an uprightly stable bottle, a foamed polystyrene receptacle member encircling the bottle, a shrunk-on skin of vinyl, which can be seamed, surrounds the receptacle member, and a base which is welded to the shrunk-on skin.

U.S. Pat. No. 3,955,020 discloses a self supporting uprightly stable glass container having a plastic film and what is called a film cup placed over the heel of the container.

U.S. Pat. No. 3,912,100 discloses an uprightly stable glass bottle having a bottom film covering and a heat shrunk sleeve contacting the film and glass surface.

U.S. Pat. No. 3,698,586 discloses an uprightly stable glass container having a heat shrunk cup on its bottom and a plastic film, which may be a heat shrinkable plastic sleeve, covering the glass container above the cup.

As will be readily apparent, none of the foregoing patents describe the present invention and represent only isolated disclosures which are not directed to solving the problem solved by applicant nor to satisfying the need satisfied by applicant.

The present invention will be more apparent by reference to the drawings wherein.

Figure 1:
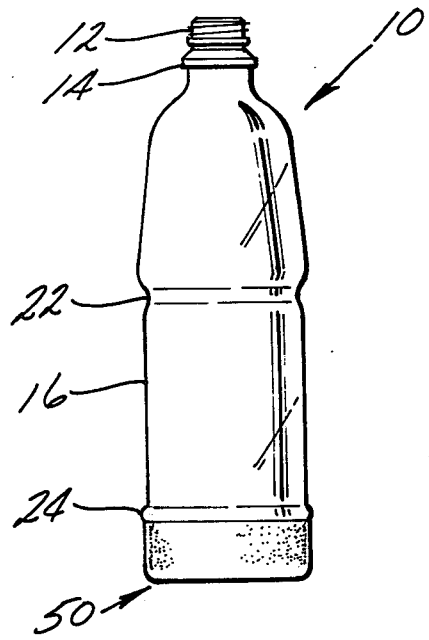
FIG. 1 is a side elevation view of a bottle having a separate support base securely attached thereto.

Initially, in accordance with this invention, there is provided a heat shrinkable organic polymeric pre-decorated sleeve label with the label having a high heat shrinkage in the circumferential direction of the sleeve and a low heat shrinkage in the axial direction of the sleeve. The sleeve is of sufficient axial length so that upon being heat shrunk it is brought into snug encircling engagmeent with the external surfaces of the bottle and the external surfaces of the base and seals any opening between the bottle and the base immediately adjacent the upper terminus of the base.

In a first embodiment, the sleeve label is formed of a thermoplastic organic polymer and most desirably will comprise a closed cellular thermoplastic organic polymer. Exemplary of suitable polymers are the polyolefins like polyethylene and polypropylene, and copolymers of ethylene with alpha-beta monoethylenically unsaturated carboxylic acids, e.g. acrylic acid or methacrylic acid, or their alkyl esters, e.g. those containing 1-3 carbon atoms in the alkyl group like ethylene-acrylic acid copolymers, or methacrylic acid copolymers or ethylene ethyl acrylate copolymers, or copolymers of ethylene with vinyl esters, e.g. ethylene-vinyl acetate copolymers. In the foregoing the olefin moiety will be vastly predominant, i.e., in excess of about 60% by weight, desirably in excess of 70% and preferably in excess of 80 or 90%. Exemplary of other sleeve labels as contemplated herein are those cellular/non-cellular composite laminates as set forth in copending applications U.S. Ser. Nos. 504,111, now U.S. Pat. No. 4,038,446 and 555,789 (filed by Roger R. Rhoads) and U.s. Ser. Nos. 505,646, now abandoned and 555,507, now U.S. Pat. No. 3,979,000 (filed by James A. Karabedian) all of which are hereby incorporated by reference. Extremely outstanding results are obtained wherein the sleeve label comprises a closed cellular polystyrene, for example crystalline generaly purpose polystyrene having a weight average molecular weight on the order of about 100,000 to about 320,000 and with the label having a thickness of about 0.005 to about 0.040 inches and a density of about 6 to about 40 pounds per cubic foot.

Outstanding results are obtained by employing such a closed cellular polystyrene sheet and producing the heat shrinkable sleeve in accordance with the teachings of U.S. Pat. No. 3,767,496 which is hereby incorporated by reference. In accordance with the procedure of that patent a cellular tubular member is extruded from a circular die and is inflated as it issues from the diehead to provide for a cross, or transverse, stretching and orientation of the material and the inflated tubular member is likewise stretched or drawn in the machine direction of extrusion to provide a machine direction orientation with both of these orientations being set by air cooling of the tubular member. The stretching and cooling produces an orientation which, in turn, results in the capability of the material to heat shrink when subsequently exposed to heat. The machine direction of heat shrinkage is high and the cross direction heat shrinkage will be low, i.e., the ratio of the heat shrinkage in the machine direction to the heat shrinkage in the cross direction will be greater than 1 and, preferably, greater tha 2:1 with quite desirable values being that the machine direction of heat shrinkage is in excess of about 60% and the cross direction of heat shrinkage is less than about 30%. Outstanding results are obtained by sufficient stretching to obtain a heat shrinkage in the machine direction of greater than 65% and a heat shrinkage in the cross direction of less than about 20%.

The inflated tubular heat shrinkable material is then slit and trimmed to obtain a sheet of roll stock which sheet of roll stock is decorated so that the decoration reads properly in the machine direction of extrusion. The decorated sheet is then, in turn, cut into smaller rectilinear sheets and then formed into a sleeve type pre-decorated label by werapping these sheets on a mandrel, with the machine direction of extrusion corresponding to the circumferential direction of the sleeve to be formed and the cross direction of extrusion corresponding to the axial direction of the to be formed sleeve, and then bringing opposed ends together and joining them to form a sleeve with an axial seam therealong. Preferably the opposed ends are brought into overlapped relationship and heat sealed to provide for a pre-decorated sleeve label with an overlapped axially heat sealed seam.

While thus far it has not been necessary to do so, in employing a heat shrinkable pre-decorated sleeve label comprising a closed cellular foamed polystyrene as described above and employing a biaxially oriented thermoplastic bottle of an ethylene glycol (including its esters)-terephthalic acid (including its esters) reaction product, depending on the specific application and materials employed it may be desirable to include pleats in the sleeve which run parallel to the axial seam. These pleats may be formed in accordance with the teachings set forth in U.S. Pat. No. 3,951,292 which is directed to a pilfer-proof, heat shrunk neckband for a glass container and closure.

In a second embodiment, the sleeve label is formed of a thermoplastic material of the clear film type. Exemplary of suitable thermoplastic materials are polyvinyl chloride, polypropylene, polyethylene, and polyethylene terephthalate. The clear film thermoplastic label of the second embodiment preferably has a thickness of from about 0.003 to about 0.0015 inches, and it may be attached to the package by an adhesive or hot melt glue, such as shown in U.S. Pat. No. 3,952,890. The method for heat shrinking the clear plastic film around the bottle-base combination as well as the method for heat sealing the opposed ends of the clear plastic film is the same as that previously described for the closed cellular thermoplastic organic polymer of the first embodiment. The film label preferably extends to within about 0.0625 to about 0.125 inch of the base bottom which helps to hide the base and further holds the base securely against the bottle. The label extends upwardly from the base to at least cover the juncture between the base and the bottle, and it may extend to a point adjacent the upper end of the bottle. The desired printing is done on the inside of the label before the sleeve label is fabricated.

Referring now more particularly to the drawings it will be seen that essentially the packages contemplated herein include an uprightly unstable bottle, a preformed generally cup-shaped support base telescopically and securely attached to the bottle, a heat-shrunk pre-decorated sleeve label and a closure, the later not being illustrated in the drawing. Referring now to the drawings, FIG. 1 illustrates as a first embodiment an uprightly unstable bottle 10, for example of biaxially oriented poly (ethylene terephthalate), which has been formed by conventional known techniques. A preformed generally cupshaped supporting base 50 is shown in telescopic and secure attachment to bottle 10. This base provides support upon which the bottle can stand in a stable upright position. Base 50 may be formed of any suitable organic polymer preferably a thermoplastic polymer for example by an injection molding technique and will be a generally rigid structure. That is, and as will be subsequently seen, base 50 will be sufficiently rigid to provide the needed strength to support the uprightly unstable bottle but will be sufficiently resilient to allow the base to accommodate a telescopic secure fit, or attachment, with the bottle. A preferred material for base 50 is high density polyethylene.

Bottle 10 generally includes a peripheral sidewall and the sidewall comprises a finish 12 which is adapted to receive a suitable closure to enclose the mouth opening of the bottle, the latter two not being shown in the drawings, a neck support ledge 14 adjacent the finish and a body portion 16. Additionally, and as more clearly illustrated in FIGS. 4 and 5 of bottle 10 of the first embodiment, also includes a generally convex, or dome-shaped, pressure bottom 18 which is inter-connected with body portion 16 by an arcuate annular heel 20. Other features of the bottle 10 include, in the peripheral sidewall, a peripheral gripping groove 22 disposed somewhat centrally along the axis of bottle 10 and at a lower portion thereof a peripheral bulbous projection 24 which serves as a bumper-like member.

Figure 4:
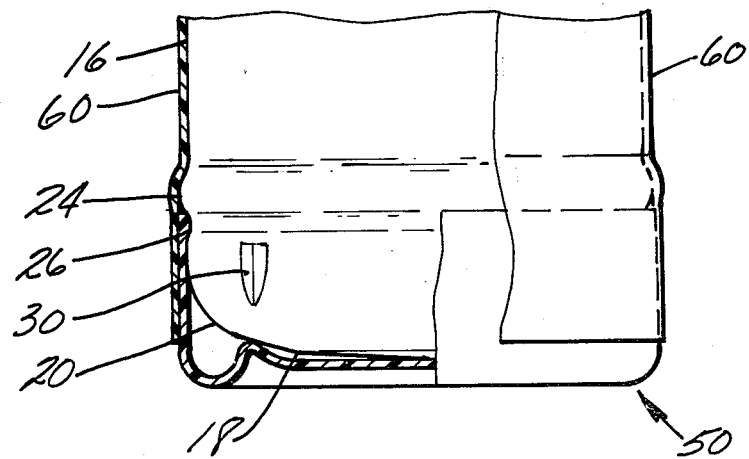
FIG. 4 is a partial cross-sectional view of the bottom portion of a package of this invention illustrating details of the best mode presently contemplated in practicing the invention.
Figure 5:
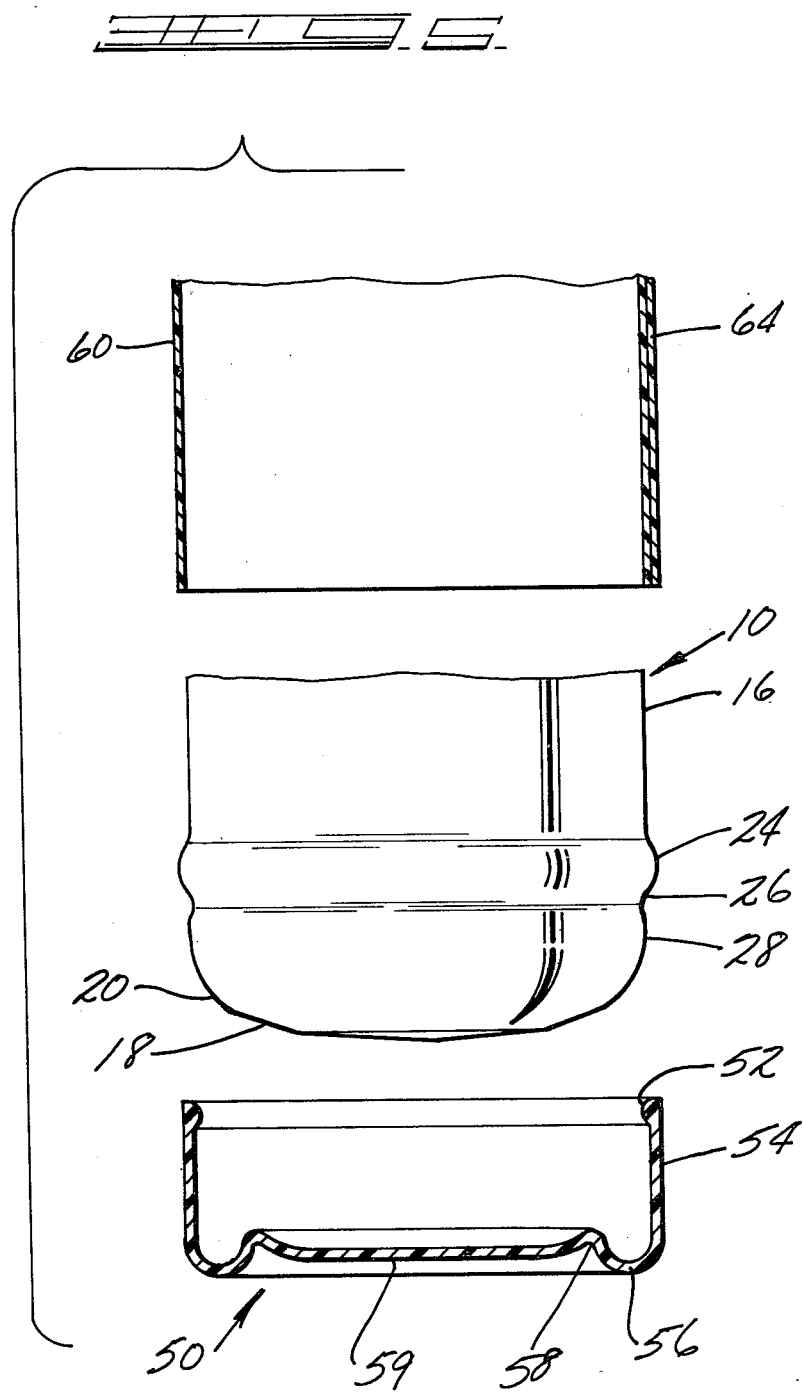
FIG. 5 is a partial cross-sectional view with the support base, bottle, and pre-decorated sleeve in disassembled relationship.
Figure 6:
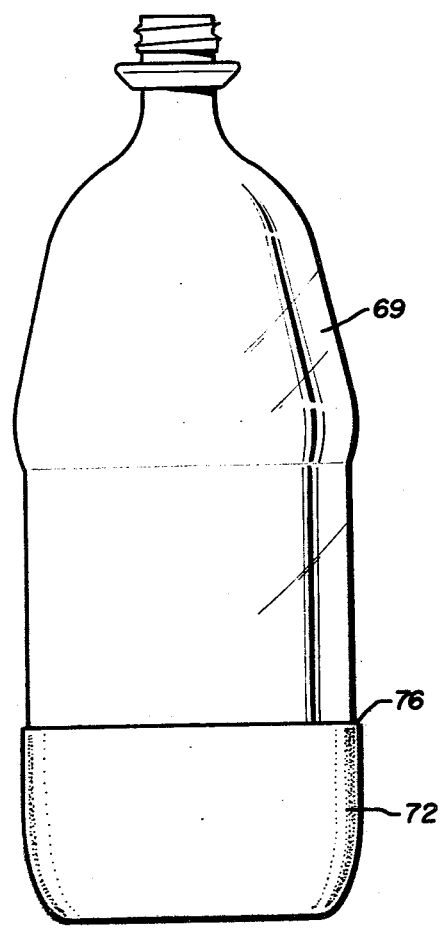
FIG. 6 is a side elevation view of a bottle in a second embodiment having a separate support base securely attached thereto.

Turning now more specifically to FIG. 4 and FIG. 5 it will be seen that the configuration of the bottle bottom 18 is such that it is incapable of supporting the bottle in a stable upright position, hence requiring a support base 50. To accommodate the retention of the generally cup-shaped support base 50 on the lower or bottom portion of bottle 10 a peripheral circumferential groove 26 is provided in the body portion 16 of the peripheral sidewall near the container bottom. Disposed on the peripheral sidewall intermediate bottom 18 and groove 26, bottle 10 is provided with at least one surface indentation 30, shown in FIG. 4, which provides for an air venting passageway to release air which is trapped between the support base 50 and bottle 10 upon telescopic and secure attachment of these two members.

The preformed generally cup-shaped support base 50 which is telescopically and securely attached to bottle 10 includes a support surface 56 and, proceeding upwardly therefrom, a tubular sidewall 54 which sidewall includes at an upper end a radially inward bead or lip 52. Base 50 further includes a generally inverted-V rib 58 which engages and supports the bottom of a bottle and a central region 59 which also engages and supports the container bottom. Preferably bottle 10 includes a circumferential portion, generally designated 28 in FIG. 5, the external surface of which has a diameter that is slightly greater than the internal diameter of bead 52 of base 50. Thus as will be appreciated from FIG. 5, and as more clearly shown in FIG. 4 the bottle 10 and the support base 50 are axially moved relative to each other to telescopically and securely attach base 50 to bottle 10. During this axial movement the air, which is compressed internally of the base 50 and bottle 10 as the lip 52 engages portion 28 and causes the latter to be strained outwardly, is released through the indentations 30. Continued axial movement results in a final position, as that generally shown in FIG. 4, with lip 52 returning inwardly and snapping into nesting engagement with circumferential groove 26. As generally indicated in the drawings, the upper terminus of sidewall 54 is generally disposed in the lower one-third of the axial height of the package.

Figure 7:
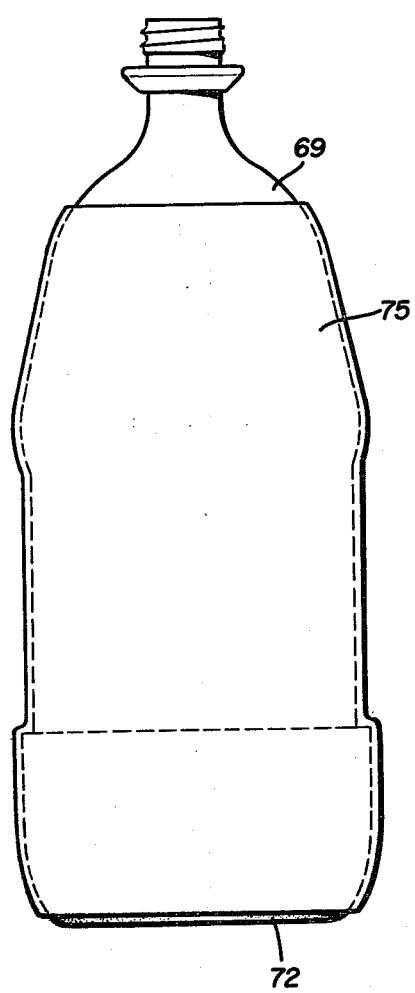
FIG. 7 illustrates a package in accordance with the second embodiment having a heat shrunk, pre-decorated tubular label in contact with external surface portions of a base and bottle of the type set forth in FIG. 6.
Figure 8:
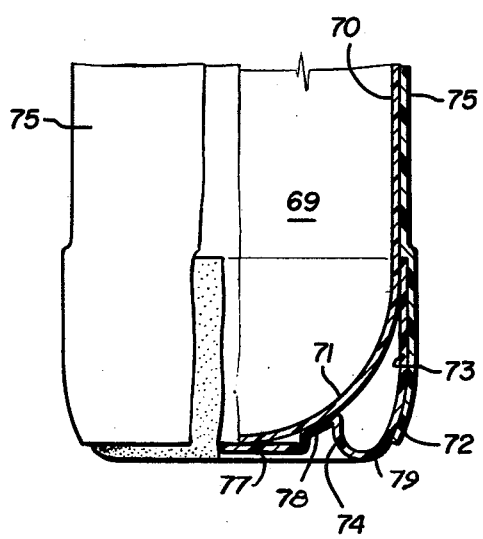
FIG. 8 is an enlarged, partial view similar to FIG. 7, with parts broken away and in section; and, FIG. 9 is a fragmentary cross-sectional view of the second embodiment with the support base, bottle, and pre-decorated sleeve in an exploded, disassembled relationship.
Figure 9:
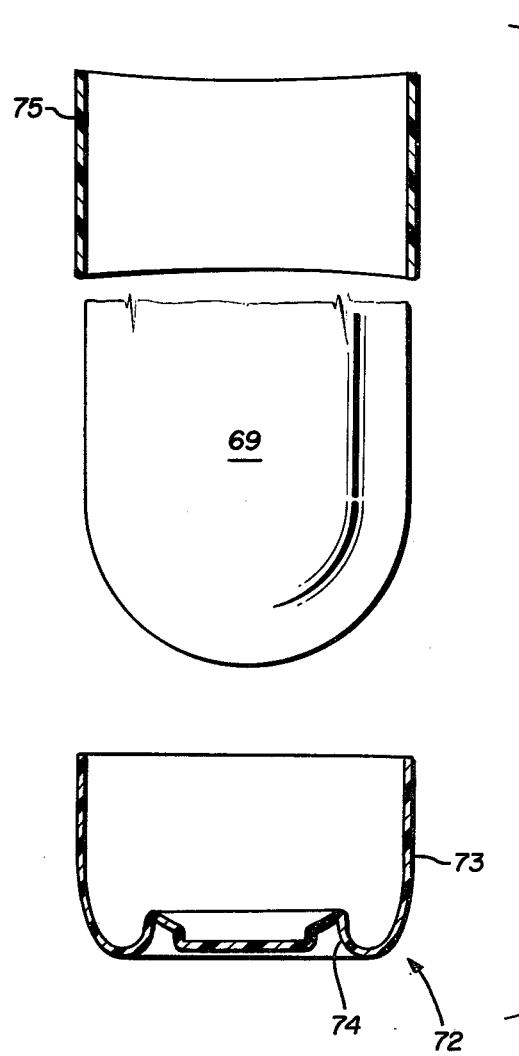

Referring now more particularly to FIGS. 6 through 9, the description of the second embodiment of the invention follows. It will be seen that the package contemplated for the second embodiment includes an uprightly unstable bottle 69 and a preformed generally cup-shaped support base 72 telescopically and securely attached to the bottle. Referring to FIG. 7, the heat-shrunk pre-decorated sleeve label 75 has been added for illustration. The preformed generally cup-shaped supporting base 72 and the bottle 69 are formed as previously described for base 50 and bottle 10. Bottle 69 differs from bottle 10 in that it has a generally cylindrical body portion 70 and a bottom portion 71 which is continuously convexly arcuate, the groove of the first embodiment being eliminated. Referring to FIG. 8, the preformed generally cup-shaped support base 72 which is telescopically attached to bottle 69 includes a tubular wall portion 73, the upper end of which snugly engages the outer surface of the bottle body portion 70. The base 72 also includes a lower annular support 79 which is the support surface for the bottle-base package. A central bottom wall 77 engages the bottom 71 of the bottle 69. A conical wall 74 extends upwardly and inwardly, sloping from the support 79 to an annular conical support ledge 78 surrounding the bottom 71 of the bottle 69. The annular conical support ledge 78, in turn, slopes downwardly to join the central bottom wall 77. To secure the bottle 69 to the base 72, adhesive may be applied between the bottom bottle portion 71 and the central bottom wall 77 of the base 72, between the annular conical support ledge 78 and bottle, or between the tubular wall portion 73 and bottle.

Figure 2:
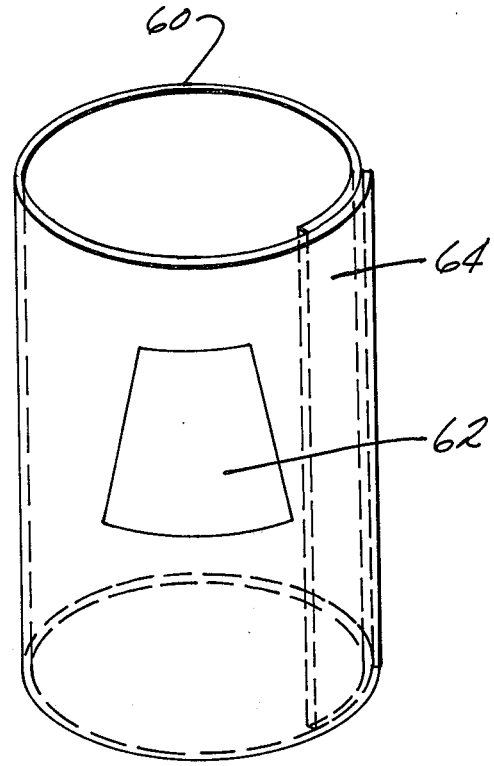
FIG. 2 illustrates a package in accordance with the invention having heat shrunk, pre-decorated sleeve-like label in contact with external surface portions of a base and bottle of the type set forth in FIG. 1.
Figure 3:
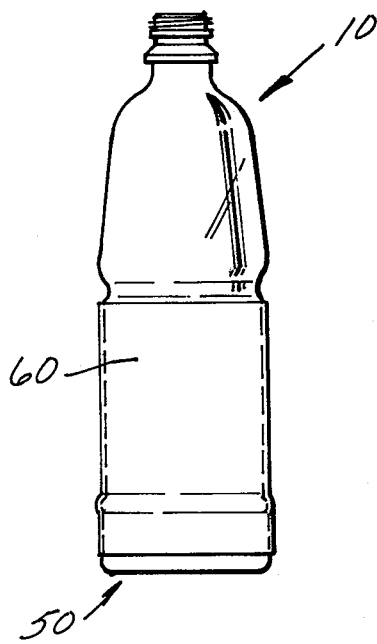
FIG. 3 illustrates a pre-decorated, heat shrinkable sleeve employed in accordance with the present invention.

In order to solve the problems and satisfy the needs hereinbefore indicated, a heat shrinkable, pre-decorated, tubular sleeve, generally designated 60 and as hereinbefore described, is employed and is set forth in FIG. 3. This sleeve is formed in the manner previously described and includes a decoration 62 thereon and an axial seam 64, preferably a heat sealed overlapped seam. For simplicity decoration 62 is not exemplified in the other figures. Generally decoration 62 will be continuous about the circumference of the sleeve, i.e., a 360° decoration, or in some cases will be a repeating pattern. After bottle 10 and base 50 have been telescopically positioned relative to another and then relatively axially displaced to securely attach bottle 10 to base 50, entry of contaminants between the bottle and the base is precluded by encircling, adjacent the upper terminus of base 50, externally disposed side surfaces of the bottle and base within the heat-shrinkable pre-decorated sleeve or label 60 and the sleeve is then heated for a time and at a temperature sufficient to bring it into substantially contour conforming, snug, heat shrunk engagement with externally disposed side surfaces of bottle 10 and support base 50 as generally indicated in FIG. 4 and FIG. 2. As best seen in FIG. 4 the height of sleeve 60 will be at least sufficient to be in contact with the external surface of projection 24 and the external surface of sidewall 54 and continuously and annularly spans the upper terminus of sidewall 54 to preclude entry of contaminants internally of base 50. It will also be observed that upon being heat shrunk, sleeve 60 generally conforms to the contour of projection 24. Additionally sleeve 60 is preferably not in a welded, or melt bonded, engagement with either base 50 or bottle 10 and hence allows for removal thereof and the use of another pre-decorated label which may, for example, have a different decoration. Usually sleeve 60 will be so selected such that upon being heat shrunk its upper terminus will generally be disposed in the lower two-thirds of the axial length of the package. In the second embodiment, the sleeve label 75 is made of a clear thermoplastic film, as previously described. The sleeve 75 includes reverse printing or decoration on the inside of the sleeve and it is heat shrunk onto the bottle 69 and base 72 combination to seal juncture 76 shown in FIG. 6 in the same manner as just described for sleeve 60. The axial seam formed when 75 is placed on bottle 69 is heat sealed also as described for sleeve 60.

In order to assist those in making and using the present invention the following represents a suitable method of practicing it. A biaxially oriented poly (ethylene terephthalate) bottle 10 of the first embodiment having an injection molded, high density polyethylene support base (50) thereon (the thickness of wall 54 being about 0.025 inches) was encircled with a heat shrinkable pre-decorated sleeve label (60) having an axially heat sealed seam which label was formed from a monoextruded close cellular film of crystalline general purpose polystyrene. The film employed to produce the sleeve had a density of about 14 pounds per cubic foot and a thickness of about 0.015 inches. The rectilinear sheet from which the sleeve was formed had a heat shrinkage in the machine direction of extrusion of 70% and a heat shrinkage of about 10% in the cross direction with the sleeve being so formed such that the heat shrinkage in the circumferential direction of the sleeve was about 70% and the heat shrinkage axially of the sleeve was about 10%. The formed sleeve was slightly elliptical and was positioned and encircled about the bottle and base with the minor axis being small enough such that it was generally held in position by frictional contact with the bulbous projection 24. The bottle was chucked by its neck and rotated and hot air, at a temperature of about 350° F. was applied to the sleeve while the bottle was rotating for a period of about 6 seconds to effect the non-melted heat shrunk engagement of sleeve 60 to external surfaces of bottle 10 and base 50 and leaving a lower portion of base 50 exposed. To further assist those skilled in the art, when temperatures on the order of about 400 to 450° F. were employed for periods of about 12-14 seconds a substantial deformation of the bottle took place as a result of the shrinkage thereof. Other temperatures for the above method may be used depending on the materials used.

While the above sets forth the present invention it will of course be apparent that modification is possible which pursuant to the patent statutes and laws does not depart from the spirit and scope of the present invention.

I claim:

1. In a package comprised of an uprightly unstable biaxially oriented thermoplastic polyester bottle and a generally cup-shaped base telescopically and securely mounted on the bottom of the bottle for supporting the bottle in a stable upright position, said bottle including a generally cylindrical body portion and a circumferential groove formed in said body portion adjacent the bottle bottom and having a venting passageway disposed between the bottle bottom and said groove and wherein said base includes a tubular wall portion essentially of the same diameter as the bottle body portion and having an inwardly extending radial lip positioned within said groove, the improvement comprising a heat shrunk, contaminant impermeable, foamed thermoplastic, tubular label in snug, peripheral engagement with external surfaces of said body portion of said container and said tubular wall portion of said base and sealingly bridging the juncture betwen said base and said bottle for precluding entry of contaminants through said groove and/or passageway into said base, said label terminating within the confines of said base tubular wall portion so that the package is supported in an upright position on the uncovered bottom of said base.

2. In a package comprising an uprightly unstable biaxially oriented thermoplastic polyester bottle and a generally cup-shaped base telescopically and securely mounted on the bottom of the bottle for supporting the bottle in a stable upright position, said bottle including a generally cylindrical body portion and a circumferential groove formed in said body portion adjacent the bottle bottom and having a venting passageway disposed between the bottle bottom and said groove and wherein said base includes a tubular wall portion essentially of the same diameter as the bottle body portion and having an inwardly extending radial lip positioned within said groove, the improvement comprising a heat shrunk, contaminant impermeable, thermoplastic, tubular label in snug, peripheral engagement with external surfaces of said body portion of said container and said tubular wall portion of said base and sealingly bridging the juncture between said base and said bottle for precluding entry of contaminants through said groove and/or passageway into said base, said label terminating within the confines of said base tubular wall portion so that the package is supported in an upright position on the uncovered bottom of said base.

3. In a package comprising an uprightly unstable biaxially oriented thermoplastic bottle and a generally cup-shaped base telescopically and securely mounted on the bottom of the bottle for supporting the bottle in a stable upright position, said bottle including a generally cylindrical body portion and a bottom portion being continuously convexly arcuate, said base having a tubular wall portion fitted around said body portion and an inwardly extending annular conical wall portion engaging the bottom portion of the bottle, and adhesive joining the base and the bottle in assembly, the improvement comprising a heat shrunk, contaminant impermeable, thermoplastic tubular label in snug peripheral engagement with external surfaces of said body portion of said bottle and said tubular wall portion of said base and sealingly bridging the juncture between said base and said bottle for precluding entry of contaminants through said juncture into said base, said label terminating within the confines of said base tubular wall portion so that the package is supported in an upright position on the uncovered bottom of said base.

4. A package comprising a biaxially oriented thermoplastic bottle having a generally cylindrical body and a generally convex bottom and a generally cup-shaped base telescopically mounted on the bottle for supporting the bottle in a stable upright position, said base enclosing the bottle bottom and having a tubular wall portion peripherally enclosing a part of said body and in peripheral engagement therewith, the base having an inwardly extending annular conical portion that contacts the bottom of the bottle, an adhesive joining the base and bottle in assembly so the bottle is supported in a stable upright position, and a contaminant-impermeable, heat-shrunk, thermoplastic, generally tubular label in snug, peripheral, enclosing engagement with the external surfaces of said body portion of said bottle and said tubular wall portion of said base to sealingly bridge the juncture between said base and said bottle for precluding entry of contaminants through said juncture into said base, said label terminating within the confines of said base tubular wall portion so that the package is supported in an upright position on the substantially uncovered bottom of the base.

5. The package of claim 4 wherein the tubular label is fabricated from a closed cell thermoplastic foamed sheet.

6. The package of claim 4 wherein the tubular label is fabricated from a clear thermoplastic film.

7. A package as defined in claim 4 for carbonated beverages in which the bottle is made of polyethylene terephthalate, and the body and bottom of the bottle are biaxially oriented.

8. A package as defined in claim 7 in which the label is predecorated and substantially hides the base from view.

* * * * *